INVENTOR.
PAUL A. KING

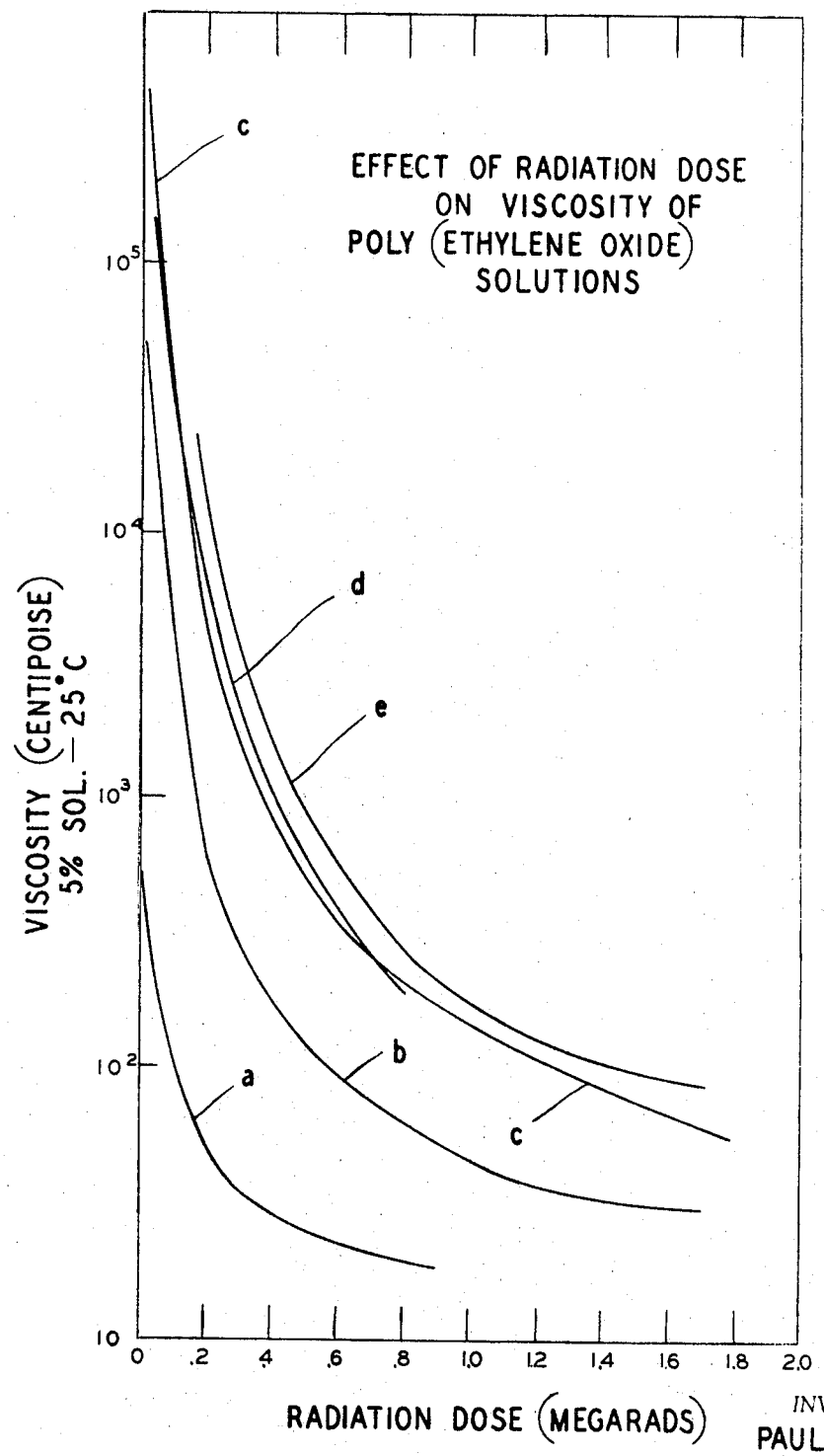

United States Patent Office 3,470,078
Patented Sept. 30, 1969

3,470,078
IRRADIATED POLY(ETHYLENE OXIDE)
AND PROCESS THEREFOR
Paul A. King, Warwick, N.Y., assignor to Union Carbide Corporation, a corporation of New York
Continuation of application Ser. No. 273,728, Apr. 17, 1963. This application July 31, 1967, Ser. No. 657,426
Int. Cl. C08f 1/16
U.S. Cl. 204—159.14        10 Claims

ABSTRACT OF THE DISCLOSURE

Water-soluble homopolymers, copolymers and terpolymers of polyethylene oxide irradiated by exposure to ionizing radiation in a total dose between about 0.01 and about 5 megarads and having a reduced viscosity value of at least 1.1, aqueous solutions of the irradiated polymer, characterized by viscosities at least 10 percent lower than aqueous solutions of an otherwise identical but unirradiated polymer, and by a marked decrease in pituitousness and by relatively small changes in viscosity compared to aqueous solutions of an otherwise identical but unirradiated polymer at the same concentration and temperature.

---

Figure 1:
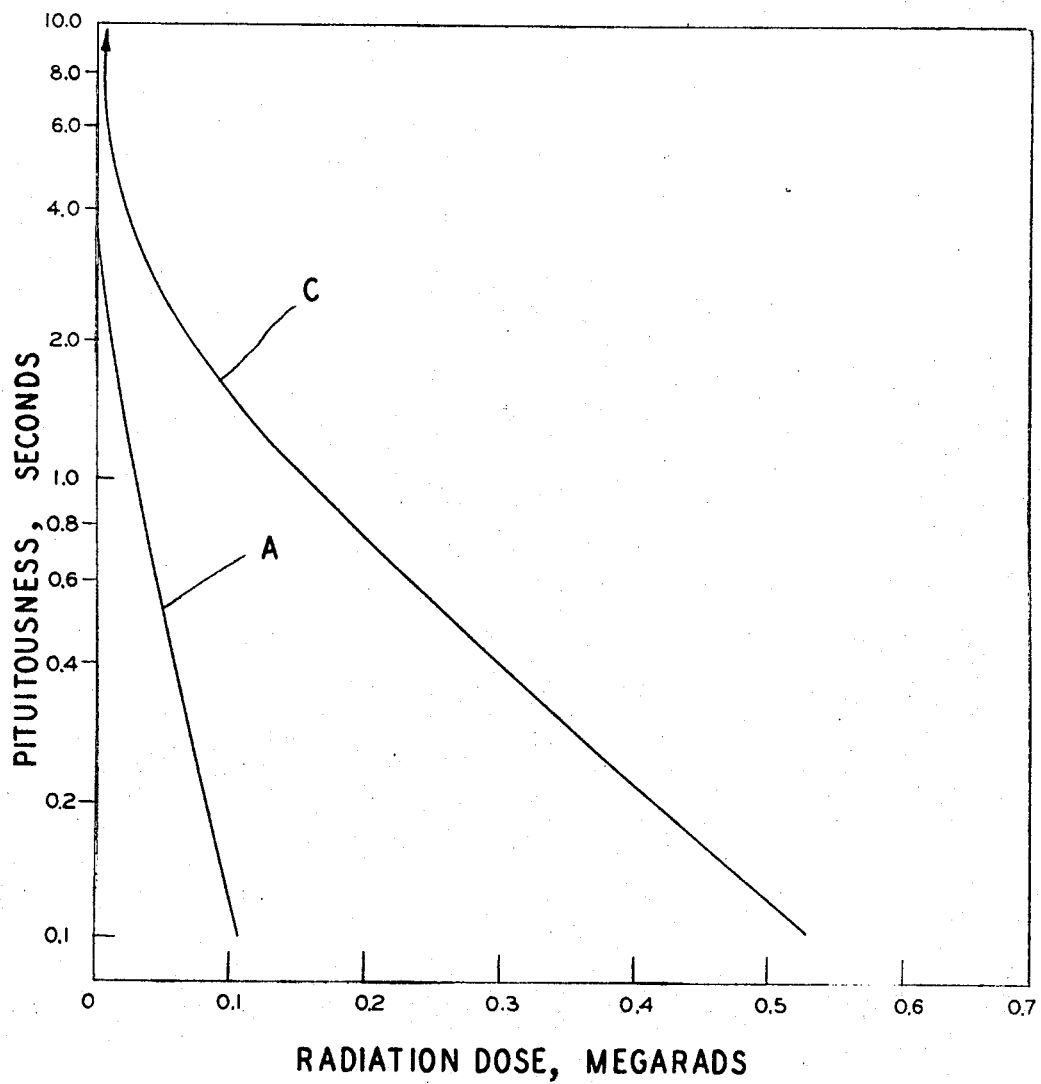

This application is a continuation of copending application Ser. No. 273,728, filed Apr. 17, 1963.

The present invention relates to poly(ethylene oxide). More particularly, the invention is directed to irradiated poly(ethylene oxide), aqueous solutions of which are characterized by improved physical properties, and to a process for preparing the improved poly(ethylene oxide) by means of ionizing radiation.

Conventional poly(ethylene oxide) has found a variety of uses in chemical industry. It is regularly employed as a water soluble resin, a thickening agent, a component in warp size applications, in cosmetic bases, adhesives and the like. One of the most important commercial uses of poly(ethylene oxide) is as a thickening agent for aqueous solutions.

Although conventional poly(ethylene oxide) has been extremely useful, aqueous solutions thereof have been subject to several disadvantages, such as a relatively large change in the viscosity of aqueous solutions with time or under shear stress, and the relatively high pituitousness of the aqueous solutions.

It is an object of the present invention ot provide irradiated poly(ethylene oxide) which has improved physical properties and, in particular, to provide improved poly(ethylene oxide), aqueous solutions of which are not subject to the disadvantages mentioned above.

Another object of the invention is to provide irradiated poly(ethylene oxide), aqueous solutions of which are characterized by relatively small change in viscosity on standing or under shear stress.

Another object of the invention is to provide improved poly(ethylene oxide), aqueous solutions of which are characterized by a reduced pituitousness (slimey consistency and stringiness) in comparison to aqueous solutions of conventional poly(ethylene oxide).

A still further object of the invention is to provide a process for producing improved poly(ethylene oxide) by subjecting conventional poly(ethylene oxide) to relatively high energy ionizing radiation.

These and other objects and advantages of the invention will be apparent from the following description and appended claims.

FIGURE I is a graph illustrating the smooth decrease in pituitousness of aqueous solutions of poly(ethylene oxide) with increasing radiation dose.

FIGURE II is a graph illustrating the smooth decrease in viscosity of aqueous solutions of poly(ethylene oxide) with increasing radiation dose.

Polymers of ethylene oxide contain the basic structural unit $(-CH_2CH_2O-)_n$, wherein the integer $n$ can vary from small integral values up to $1 \times 10^6$ or even greater. The relatively low molecular weight polymers of ethylene oxide (having molecular weights up to about 20,000) are not subject to the disadvantages referred to above. Accordingly, the term "poly(ethylene oxide)" as used herein defines a relatively high molecular weight polymer of ethylene oxide characterized (prior to irradiation) by a reduced viscosity in acetonitrile at 30° C. of at least about one.

The term "reduced viscosity" as used herein means the value obtained by dividing the specific viscosity by the concentration of the polymer in solution, the concentration being expressed in grams of polymer per 100 milliliters of solvent at the given temperature. The specific viscosity is obtained by dividing the difference between the viscosity of the solution and the viscosity of the solvent by the viscosity of the solvent. Unless otherwise indicated, the reduced viscosity values given herein are determined at a concentration of 0.2 gram of polymer per 100 milliliters of acetonitrile at 30° C. The measured viscosity of a polymer solution is referred to herein as bulk viscosity.

For ethylene oxide polymers, a reduced viscosity of one in acetonitrile at 30° C. corresponds to an average molecular weight of about 50,000 to 100,000. It is the poly(ethylene oxide) having at least this reduced viscosity whose aqueous solutions have in the past been subject to viscosity instability and high pituitousness.

The present invention also applies to water soluble copolymers, terpolymers and higher interpolymers of ethylene oxide with other hydrocarbon-substituted ethylene oxides, preferably copolymers and terpolymers which contain at least 75 mol percent ethylene-oxy units with the balance made up of one or more of the units propylene-oxy, butylene-oxy and styrene-oxy. Examples of the preferred copolymers and terpolymers are copolymers of ethylene oxide and propylene oxide, copolymers of ethylene oxide and 1,2-butylene oxide, copolymers of ethylene oxide and styrene oxide, copolymers of ethylene oxide and 2,3-butylene oxide, terpolymers of ethylene oxide, 1,2-butylene oxide and styrene oxide, terpolymers of ethylene oxide, propylene oxide and 2,3-butylene oxide, and the like. The copolymers, terpolymers and higher interpolymers useful in this invention are water soluble and are characterized by reduced viscosities in acetonitrile at 30° C. of at least one.

The improved poly(ethylene oxide) of this invention can be produced by subjecting conventional poly(ethylene oxide) to ionizing radiation. As used herein, the term "ionizing radiation" includes that radiation which has sufficient energy to cause electronic excitation and/or ionization in the poly(ethylene oxide) molecules and solvent molecules (where a solvent is employed) but which does not have sufficient energy to affect the nuclei of the constituent atoms. Convenient sources of suitable ionizing radiation are gamma ray producing radioactive isotopes such as $Co^{60}$ and $Cs^{137}$, spent nuclear fuel elements, X-rays such as those produced by conventional X-ray machines, and electrons produced by such means as Van de Graff accelerators, linear electron accelerators, resonance transformers and the like. Suitable ionizing radiation for use in the present invention will generally have an energy level in the range from about 50 kev. (kilo electron volts) to about 20 mev. (million electron volts).

The irradiation of the poly(ethylene oxide) can be carried out in the solid phase or in solution. Solid poly(ethylene oxide) can be irradiated in contact with air, in a vacuum or under various gaseous atmospheres, while irradiation in solution can be carried out with the poly (ethylene oxide) dissolved in water, in conventional organic solvents, or in mixtures of water and water miscible organic solvents. Any convenient method can be used to bring the solid poly(ethylene oxide) or poly(ethylene oxide) solutions into contact with the ionizing radiation. Suitable methods are well known and understood by those skilled in the art, and several specific methods are set forth in the illustrative examples hereinbelow.

The exact amount of ionizing radiation to which the poly(ethylene oxide) must be subjected depends on a number of variables. In general, the amount of radiation to which the poly(ethylene oxide) is subjected must be sufficient to provide a product which is soluble in water and whose aqueous solutions exhibit a decrease in initial viscosity and pituitousness with respect to aqueous solutions of the otherwise identical but unirradiated poly(ethylene oxide) at the same concentration and temperature. However, if the poly(ethylene oxide) is subjected to too much ionizing radiation under certain conditions, some or all of the irradiated material becomes water insoluble. The water insoluble material when brought into contact with water or other solvents obsorbs relatively large amounts of the liquid but cannot be made to dissolve therein. The exact amounts of ionizing radiation which produce the improved water soluble material of this invention without causing significant production of insoluble gel-forming material depends on the conditions under which the irradiation is carried out. The amount of insoluble poly(ethylene oxide) produced is normally inisgnificant, although up to about 10 weight percent of insoluble material can be tolerated.

In general, when irradiation is carried out at relatively low dose rates and in the presence of free radial scavengers, such as oxygen, the improved water soluble material of this invention is produced. On the other hand, when the irradiation is carried out under conditions which favor the relatively long existence of the free radicals produced, as for example, when the irradiation is carried out with a high dose rate, in the absence of oxygen, or in solution where oxygen is readily used up, the formation of water insoluble gel-forming material is favored.

A preferred method for consistently producing the water soluble poly(ethylene oxide) of this invention along with only insignificant amounts of water-insoluble material is to carry out the irradiation on finely divided solid poly(ethylene oxide) in contact with air while employing ionizing radiation having an energy level in the range of about 50 kev. to about 20 mev. in a total dose of between about 0.01 and 5 megarads.

In terms of aqueous solution viscosity, the preferred minimum total radiation dose is that which produces an irradiated poly(ethylene oxide), aqueous solutions of which have a viscosity at least 10 percent lower than aqueous solutions of otherwise identical unirradiated poly(ethylene oxide) at the same concentration and temperature. The 10 percent decrease in viscosity can of course be obtained by irradiating solid poly(ethylene oxide) prior to dissolution in water, or by first dissolving unirradiated poly(ethylene oxide) in water and then subjecting the solution to ionizing radiation for a sufficient time to lower the viscosity of the solution by at least 10 percent more than the normal decrease in viscosity of solutions of unirradiated poly(ethylene oxide) with time.

Within the range of total radiation dose in which the improved water soluble poly(ethylene oxide) of this invention is produced, the viscosity of the irradiated material in aqueous solution and the pituitousness of the aqueous solution decrease smoothly with increasing radiation dose. This makes it possible to prepare irradiated poly(ethylene oxide) which, when added to water, will produce a solution having practically any desired viscosity.

In view of the above discussion of the irradiation process of this invention for producing the improved poly(ethylene oxide) and the specific illustrative examples which follow, one skilled in the art can easily select the proper conditions, radiation source, dose rate, and total radiation dose to produce the improved poly(ethylene oxide) of this invention.

The methods employed in measuring reduced viscosity, bulk viscosity, pituitousness and radiation dose were as follows:

MEASUREMENT OF REDUCED VISCOSITY

The reduced viscosity of unirradiated poly(ethylene oxide) is measured by the following method: Transfer 100 ml. of acetonitrile to an 8-oz., round, screw-cap bottle. With constant stirring introduce into the bottle, 0.200 gm. of the polymer weighed to the nearest mg. Line the screw-cap of the bottle with a piece of aluminum foil, carefully place the cap on the bottle, and tighten securely. Place the bottle on a suitable can roller with 6-inch (I.D.) rollers, and allow it to roll for 16±0.5 hr. Remove the bottle from the roller, and filter the solution by pressure through a coarse, sintered glass filter. Determine the time in seconds required for the sample solution to pass through a calibrated Ubbelohde suspended-level viscometer at 30±0.01° C. Use a suitable stopwatch with a 10-second dial graduated in 0.1 second units, accurate to within 0.1 percent when tested over a 60-minute period. Record the time required. Determine and record the time in seconds required for the acetonitrile to pass through the viscometer.

Calculation:

$$AS - \frac{F}{AS} = AC$$

$$SS - \frac{F}{SS} = SC$$

$$\frac{SC - AC}{AC} = SV$$

$$\frac{SV}{K} = RV$$

F = viscometer correction
AS = seconds required for acetonitrile
AC = seconds, corrected, required for the acetonitrile
SS = seconds required for polymer solution
SC = seconds, corrected, required for solution
SV = specific viscosity
RV = reduced viscosity
K = concentration, gm. sample per 100 ml. acetonitrile The following table illustrates the relation between the average molecular weight of unirradiated poly(ethylene oxide), reduced viscosity and bulk viscosity of solutions thereof.

| Weight percent polymer in acetonitrile | Reduced viscosity | Approximate average molecular weight | Bulk viscosity aqueous solution at 25° C. |
|---|---|---|---|
| 0.2 | 1.5 | 150,000 | 200 cps. (5 wt. percent soln.). |
| 0.2 | 60 | 10,000,000 | 7,000–9,000 cps. (1 wt. percent soln.). |

MEASUREMENT OF BULK VISCOSITY

The bulk viscosity of aqueous solutions of both irradiated and unirradiated poly(ethylene oxide) is measured by the following method:

(1) The poly(ethylene oxide) and water are employed in amounts specified in the following table and are mixed by stirring (as per (a) below) or by rolling (as per (b) below), until the polymer has dissolved.

| | Amount water (g). | Amount poly(ethylene oxide) (g). |
|---|---|---|
| Percent solution (wt. percent): | | |
| 1.0 | 495 | 5.000±0.001 |
| 5.0 | 475 | 25.0±0.1 |

(a) Stirring.—Transfer the specified amounts of distilled water to a two-quart stainless-steel beaker equipped with four ½ inch vertical baffles. Attach a three-inch diameter turbine impeller equipped with twelve ½ inch vanes to a variable speed motor. While rotating the impeller at 750 to 780 r.p.m., add the specified amount of polymer to the water so slowly that solution blocking does not occur. Continue the stirring at 750 to 780 r.p.m. for 1 to 2 minutes. Reduce the impeller speed to 250 r.p.m. for a 1.0 percent resin solution. Continue the stirring at the reduced speed.

(b) Rolling.—The specified amount of polymer is added to a screw-cap jar containing the specified amount of distilled water. The mixture is shaken vigorously for a short time to disperse the polymer and the jar is then placed on a ball mill and rolled until solution is complete. The rolling period for complete solution varies from a few hours for low viscosity samples to overnight for the high viscosity material.

(2) Measurement of viscosity.—Transfer the prepared solution to a 16-ounce (3 inches or more in diameter), round, wide-mouth, screw-cap jar. Allow this solution to stand for one hour or until essentially all of the air bubbles have dissipated, provided the required time does not exceed two hours. The solution should be at least 2.75 inches in depth. Using a model RVF or LVT Brookfield viscometer at the slowest speed and with the largest spindle which provides reasonable readings, determine the viscosity of the solution in centipoises at 25° C. according to the manufacturer's instructions.

MEASUREMENT OF PITUITOUSNESS

The pituitousness of aqueous solutions of both irradiated and unirradiated poly(ethylene oxide) is measured by the following method:

(a) Mix the poly(ethylene oxide) and water by one of the aforementioned procedures used in preparing solutions for viscosity measurements. Using a Du Nuoy surface tensiometer with a clean platinum ring, position the sample solution so that the ring can be immersed in the solution and withdrawn to leave a 1- to 2-cm. gap between the solution surface and the ring. This adjustment may be done either by raising the ring or lowering the apparatus adjustments. The ring must be parallel to the solution surface and free from kinks or irregularities.

(b) With the temperature of the sample solution at 25±0.5° C., immerse the ring in the solution, and withdraw it smoothly with moderate speed (about 1 cm. per second) to a point 1 to 2 cm. above the surface of the solution. A cylindrical film will follow the ring, but will collapse to leave a single fiber, or string, of solution between the ring and solution surface.

(c) Start a suitable stopwatch, or timer, the instant the single fiber is formed from the cylinder and stop the timer the instant this single fiber breaks. Record the time in seconds required for breakage. Observe this breakage against a dark background with strong side lighting for best results. Ignore movements of the fiber which do not result in fiber breakage.

(d) Repeat step (c) at least 5 times, and average these test results to the nearest 0.1 second.

MEASUREMENT OF RADIATION DOSE

Radiation doses for $Co^{60}$ radiation were measured by means of standard ferrous sulfate-sodium chloride-sulfuric acid dosimeter solutions using a G-value of 15.5 for the production of ferric ion.

Radiation doses for Van de Graff accelerator radiation were computed on the basis of the average dose received by the surface of the polymer. All polymer samples were thin enough to assure complete penetration of the solid by the high energy electrons. Under the above conditions, the average radiation dose is equal to the product of the beam current and the electron energy.

The following examples illustrate the process of this invention and further illustrate the unexpectedly improved physical properties of the irradiated poly(ethylene oxide) of this invention.

EXAMPLE 1

This example illustrates the improved viscosity stability of aqueous solutions of the irradiated poly(ethylene oxide) of this invention. In this example, 100 gram samples of conventional poly(ethylene oxide) having a particle size such that 90 wt. percent passed through a 10 mesh screen and having varying reduced viscosities were placed in 500 milliliter round bottom flasks. The flasks were then evacuated to about 1 micron of mercury pressure until no rise in pressure was detectable with a standard Pirrani gauge.

The flasks were then sealed and placed in close proximity to a $Co^{60}$ source. The polymers in the flasks were subjected to gamma ray radiation at a dose rate of about $0.1 \times 10^6$ rads per hour while being changed in position relative to the radiation source in order to secure homogeneous doses. The irradiated polymers were dissolved in water and the viscosities of the aqueous solutions were measured using a Brookfield viscometer (model RVF) at a speed of 2 r.p.m. and a temperature of 25° C. in accordance with procedures (1) (a) and (2) above. The solutions were allowed to stand for three weeks and the viscosities were again measured. In all instances, the irradiated samples exhibited the greater viscosity stability, the largest improvement being found in the samples of higher initial viscosity. The data are summarized in Table I.

TABLE I

| Sample | Weight percent solution | Dose (megarads) | Viscosity (centipoises) Initial | Viscosity (centipoises) After 3 weeks | Percent change in viscosity |
| --- | --- | --- | --- | --- | --- |
| A-1 | 5 | 0 | 680 | 630 | 7.4 |
| A-2 | 5 | 0.05 | 552 | 528 | 4.3 |
| A-3 | 5 | 0.30 | 127 | 120 | 5.5 |
| B-1 | 1 | 0 | 1,630 | 918 | 43.5 |
| B-2 | 1 | 0.05 | 1,160 | 1,120 | 3.5 |
| B-3 | 1 | 0.2 | 315 | | |
| C-1 | 5 | 0 | 1,740 | 1,296 | 25.5 |
| C-2 | 5 | 0.026 | 864 | | |
| C-3 | 5 | 0.12 | 120 | 113 | 5.7 |

EXAMPLE 2

This example demonstrates the improved viscosity stability under shear stress of aqueous solutions of the irradiated poly(ethylene oxide) of this invention.

Three samples of poly(ethylene oxide) were irradiated in air using a Van de Graff accelerator. A fourth sample served as a control. The four samples were dissolved in water by procedure (1)(a) above, the control sample at a concentration of 1 weight percent and the irradiated samples at a concentration of 5 weight percent. All solutions were then subjected to shear stress by stirring the solutions with a 12 blade impeller rotating at 1080 r.p.m. Viscosities before and after shear stress were measured by procedure (2) above. The results are summarized in Table II.

TABLE II

| Polymer Sample | Radiation dose (megarads) | Initial viscosity (cps.) | Agitation time (hours) | Percent retention of initial viscosity |
| --- | --- | --- | --- | --- |
| Control | 0 | *1,800 | 1.5 | *40 |
| Do | 0 | *1,800 | 2.5 | *35 |
| A | 0.043 | 130,000 | 1.5 | 60 |
| A | 0.043 | 130,000 | 2.5 | 50 |
| B | 0.10 | 22,000 | 1.5 | 75 |
| C | 0.41 | 290 | 1.5 | 110 |
| C | 0.41 | 290 | 2.5 | 115 |

* 1 wt. percent solution.

The increase in viscosity for sample C was due to slight evaporation of water from the solution during agitation.

The results summarized in Table II illustrate the large improvement in viscosity stability under shear stress that can be obtained with relatively low total radiation doses.

EXAMPLE 3

This example illustrates the unexpectedly great decrease in the pituitousness and increase in the viscosity stability of aqueous solutions of the irradiated poly(ethylene oxide) of this invention.

In this example, 100 gram samples of poly(ethylene oxide) having a particle size such that 90 wt.-percent passed through a 10 mesh screen and having varying reduced viscosities were irradiated in the presence of oxygen by placing the polymer samples in loosely capped glass jars and exposing them to gamma ray radiation from a $Co^{60}$ source at a rate of $0.1 \times 10^6$ rads per hour. The samples were repositioned during irradiation to insure homogeneous dosage. The viscosities and pituitousness of the aqueous solutions of the irradiated polymer were then measured by procedures outlined above, the polymers being dissolved in water by stirring. The results are summarized in Table III.

TABLE III

| Polymer Sample | Radiation dose (megarads) | Initial viscosity, cps. Reduced Acetonitrile | Initial viscosity, cps. 5 wt. percent aqueous soln. 25° C. | Pituitousness (5 wt. percent aqueous soln.), sec. | Viscosity (5 wt. percent aqueous soln., cps.) After 1 wk. | Viscosity (5 wt. percent aqueous soln., cps.) After 3 wks. |
|---|---|---|---|---|---|---|
| A | 0 | 3.0 | 850 | 4.0 | | |
| A | 0.05 | 1.8 | 77 | 0.5 | 66 | 67 |
| A | 0.11 | 1.3 | 40 | 0 | 34 | 35 |
| B | 0 | 3.9 | 1,620 | 2 | | |
| B | 0.05 | 2.8 | 450 | 1 | 419 | 413 |
| B | 0.11 | 2.4 | 183 | 0.1 | 181 | 184 |
| B | 0.54 | 1.1 | 23 | 0 | 22 | 24 |
| C | 0 | 33.7 | *1,744 | *12 | | *1,290 |
| C | 0.05 | 12.4 | 48,100 | 2.5 | | 47,700 |
| C | 0.11 | 7.5 | 13,000 | 1.5 | 13,140 | 11,380 |
| C | 0.54 | 2.3 | 144 | 0 | 147 | 138 |

*Measured in 1 wt. percent aqueous solution.

The data from Table III for the pituitousness of aqueous solutions of samples A and C as a function of radiation dose is plotted in FIGURE I. The plot not only illustrates the smooth decrease in pituitousness with increasing radiation dose, but also demonstrates the exceptionally large decrease in pituitousness obtained with relatively small radiation doses.

EXAMPLE 4

This example illustrates the smooth change in the viscosity of aqueous solutions of the irradiated poly(ethylene oxide) of this invention as a function of radiation dose. Several samples each of five different lots of solid poly(ethylene oxide) of varying reduced viscosities were irradiated in air using a Van de Graff accelerator as the radiation source. The poly(ethylene oxide) samples in dry powder form were transported beneath the electron beam of the accelerator by means of a variable speed continuous belt. The depth of the poly(ethylene oxide) powder on the belt was maintained at 0.5 inch or less. Radiation doses were varied by appropriate adjustments of the belt speed, electron current and electron energy. The viscosity averaged molecular weights of the unirradiated poly(ethylene oxide) materials are summarized in Table IV. The letters designating the various lots in Table IV correspond to the letters identifying the curves in FIG. II.

TABLE IV

Unirradiated poly(ethylene oxide): Molecular weight
- Lot a _____ $0.2 \times 10^6$
- Lot b _____ $0.5 \times 10^6$
- Lot c _____ $1 \times 10^6$
- Lot d _____ $3 \times 10^6$
- Lot e _____ $10 \times 10^6$ The irradiated polymers and unirradiated control samples were dissolved in water and the viscosities of 5 wt.-percent aqueous solutions measured by procedures described above. The viscosities of the solutions as a function of radiation dose are plotted in FIG. II.

The data of Examples 3 and 4, as set forth in FIGS. I and II, show that for any given conventional poly(ethylene oxide) the proper irradiation conditions can be selected to produce an irradiated polymer, an aqueous solution of which will have any desired viscosity lower than that of the unirradiated poly(ethylene oxide) while at the same time retaining the advantages of improved viscosity stability and reduction in pituitousness.

For example, where a bulk viscosity of about 1,000 centipoises is desired, a conventional poly(ethylene oxide) of sufficient molecular weight to give this viscosity would be dissolved in water at a concentration of about 5 weight percent. This initial viscosity would then be subject to radical changes with time and the 5 wt. percent solution would exhibit high pituitousness (4 to 5 sec.). These disadvantages can be overcome by starting with a higher molecular weight conventional poly(ethylene oxide), subjecting this polymer to ionizing radiation (the total dose being determined from a plot such as curve b of FIG. II) and then adding the irradiated polymer to water in a concentration of about 5 weight percent. The solution of the irradiated polymer of this invention will then have the desired viscosity of about 1000 centipoises which will remain almost constant over long periods of time, and the solution will have a low pituitousness (0 to 0.5 sec.).

EXAMPLE 5

This example illustrates the application of the process of this invention to relatively low concentration aqueous solutions of poly(ethylene oxide). Samples of poly(ethylene oxide) were irradiated in air using a $Co^{60}$ gamma ray source. The irradiated samples and a control sample were dissolved in water at a concentration of 0.2 weight percent and the viscosities of the solutions at 30° C. were measured using a Hoeppler viscometer. The results are summarized in Table V.

TABLE V

| Solution | Dose (megarads) | Viscosity (cps.) |
|---|---|---|
| a | 0 | 1.16 |
| b | 0.31 | 1.12 |
| c | 1.47 | 0.96 |
| d | 3.07 | 0.88 |
| e | 9.8 | 0.85 |
| Distilled water | | 0.79 |

EXAMPLE 6

This example illustrates the application of the process of this invention to aqueous solutions of conventional poly(ethylene oxide).

Aqueous solutions of conventional poly(ethylene oxide) were prepared by method (1)(b) above, the concentration of the polymer being 6 weight percent. The solutions were transferred to 100 milliliter glass jars and irradiated by means of a $Co^{60}$ gamma ray source. The viscosities of a control solution and the irradiated solutions were measured at 30° C. with a Hoeppler viscometer. The results are summarized in Table VI.

TABLE VI

| Polymer solution | Radiation dose (megarads) | Viscosity (cps.) | Pituitousness (qualitative) |
|---|---|---|---|
| Control | 0 | 240 | Stringy. |
| a | 0.009 | 151.7 | No stringiness. |
| b | 0.02 | 70.9 | Do. |
| c | 0.05 | 45.5 | Do. |
| d | 0.08 | 40.6 | Do. |
| e | 0.11 | 39.2 | Do. |

What is claimed is:

1. A water soluble polymer, irradiated by exposure to ionizing radiation having an energy level in the range of about 50 kev. to about 20 mev. in a total dose between about 0.01 and about 5 megarads, selected from the group consisting of poly(ethylene oxide) and copolymers and terpolymers consisting essentially of at least 75 mol percent ethylene-oxy units with the balance made up of at least one of the units propylene-oxy, butylene-oxy and styrene-oxy; aqueous solutions of the irradiated polymer characterized (a) by viscosities at least 10 percent lower than aqueous solutions of an otherwise identical but unirradiated polymer at the same concentration and temperature, and (b) by a marked decrease in pituitousness and by relatively small changes in viscosity compared to aqueous solutions of an otherwise identical but unirradiated polymer at the same concentration and temperature; said unirradiated polymer having a reduced viscosity value of from 3.0 to 33.7 and said irradiated polymer having a reduced viscosity value of at least 1.1 reduced viscosity values being determined at a concentration of 0.2 gram of said polymer per 100 milliliters of acetonitrile at a temperature of 30° C.

2. The composition of claim 1 wherein said water-soluble polymer is poly(ethylene oxide).

3. Water soluble poly(ethylene oxide), irradiated in the solid state while in contact with air by exposure to ionizing radiation having an energy level in the range of about 50 kev. to about 20 mev. in a total dose between about 0.01 and about 5 megarads and characterized as are the polymers claimed in claim 1.

4. An aqueous solution of a water soluble polymer, irradiated by exposure to ionizing radiation having an energy level in the range of about 50 kev. to about 20 mev. in a total dose between about 0.01 and about 5 megarads, selected from the group consisting of poly(ethylene oxide) and copolymers and terpolymers consisting essentially of at least 75 mole percent ethylene-oxy units with the balance made up of at least one of the units propylene-oxy, butylene-oxy and styrene-oxy, said polymer prior to irradiation having a reduced viscosity of from 3.0 to 33.7 and said polymer after irradiation having a reduced viscosity of at least 1.1 and being characterized as are the polymers claimed in claim 1, reduced viscosity values being determined at a concentration of 0.2 gram of polymer per 100 milliliters of acetonitrile and a temperature of 30° C.

5. A solution as claimed in claim 4 wherein the polymer is poly(ethylene oxide) which has been irradiated in the solid state while in contact with air.

6. A process for producing an ethylene oxide polymer of improved physical properties which comprises providing a polymer selected from the group consisting of poly(ethylene oxide) and copolymers and terpolymers consisting essentially of at least 75 mol percent ethylene-oxy units with the balance made up of at least one of the units propylene-oxy, butylene-oxy and styrene-oxy and having a reduced viscosity of from 3.0 to 33.7 at a concentration of 0.2 gram of polymer per 100 milliliters of acetonitrile and a temperature of 30° C., and subjecting said polymer to ionizing radiation for a sufficient length of time to produce a water soluble, irradiated polymer having a reduced viscosity of at least 1.1 measured at a concentration of 0.2 gram of polymer per 100 milliliters of acetonitrile and a temperature of 30° C., aqueous solutions of said irradiated polymer characterized by viscosities at least 10 percent lower than aqueous solutions of an otherwise identical but unirradiated polymer at the same concentration and temperature and by a marked decrease in pituitousness and relatively small changes in viscosity compared to aqueous solutions of an otherwise identical but unirradiated polymer at the same concentration and temperature.

7. The process of claim 6 wherein said poly(ethylene oxide) is subjected to ionizing radiation in the solid state while in contact with air.

8. The process of claim 6 wherein said poly(ethylene oxide) is subjected to ionizing radiation in the solid state while under vacuum.

9. The process of claim 6 wherein said poly(ethylene oxide) is subjected to ionizing radiation in aqueous solution.

10. A water solution polymer, irradiated by exposure to ionizing radiation having an energy level in the range of about 50 kev. to about 20 mev. in a total dose between about 0.01 and about 5 megarads, selected from the group consisting of poly(ethylene oxide) and copolymers and terpolymers consisting essentially of at least 75 mol percent ethylene-oxy units with the balance made up of at least one of the units propylene-oxy, butylene-oxy and styrene-oxy; aqueous solutions of the irradiated polymer characterized (a) by viscosities at least 10 percent lower than aqueous solutions of an otherwise identical but unirradiated polymer at the same concentration and temperature, and (b) by a marked decrease in pituitousness and by relatively small changes in viscosity compared to aqueous solutions of an otherwise identical but unirradiated polymer at the same concentration and temperature; said unirradiated polymer having a reduced viscosity value of at least about 1.2, and said irradiated polymer having a reduced viscosity value of at least 1.1, reduced viscosity values being determined at a concentration of 0.2 gram of said polymer per 100 milliliters of acetonitrile at a temperature of 30° C.

References Cited

Pearson: "The Effect of Gamma-Irradiation Upon Poly(Ethylene Oxides)," Radioisotopes in Scientific Research, Proc. 1st Intern. cont., Paris, 1 (1957), pp. 151–160.

MURRAY TILLMAN, Primary Examiner

R. B. TURER, Assistant Examiner

U.S. Cl. X.R.

260—2

UNITED STATES PATENT OFFICE

CERTIFICATE OF CORRECTION

Patent No. 3,470,078            September 30, 1969

Paul A. King

It is certified that error appears in the above identified patent and that said Letters Patent are hereby corrected as shown below:

In claim 10, line 1, change "solution" to -- soluble --.

Signed and sealed this 23rd day of December 1969.

(SEAL)
Attest:

Edward M. Fletcher, Jr.
Attesting Officer

WILLIAM E. SCHUYLER, JR.
Commissioner of Patents